Dec. 29, 1925.
M. SITTIG
1,567,760
WATERING FOUNTAIN FOR CHICKS
Filed April 15, 1925
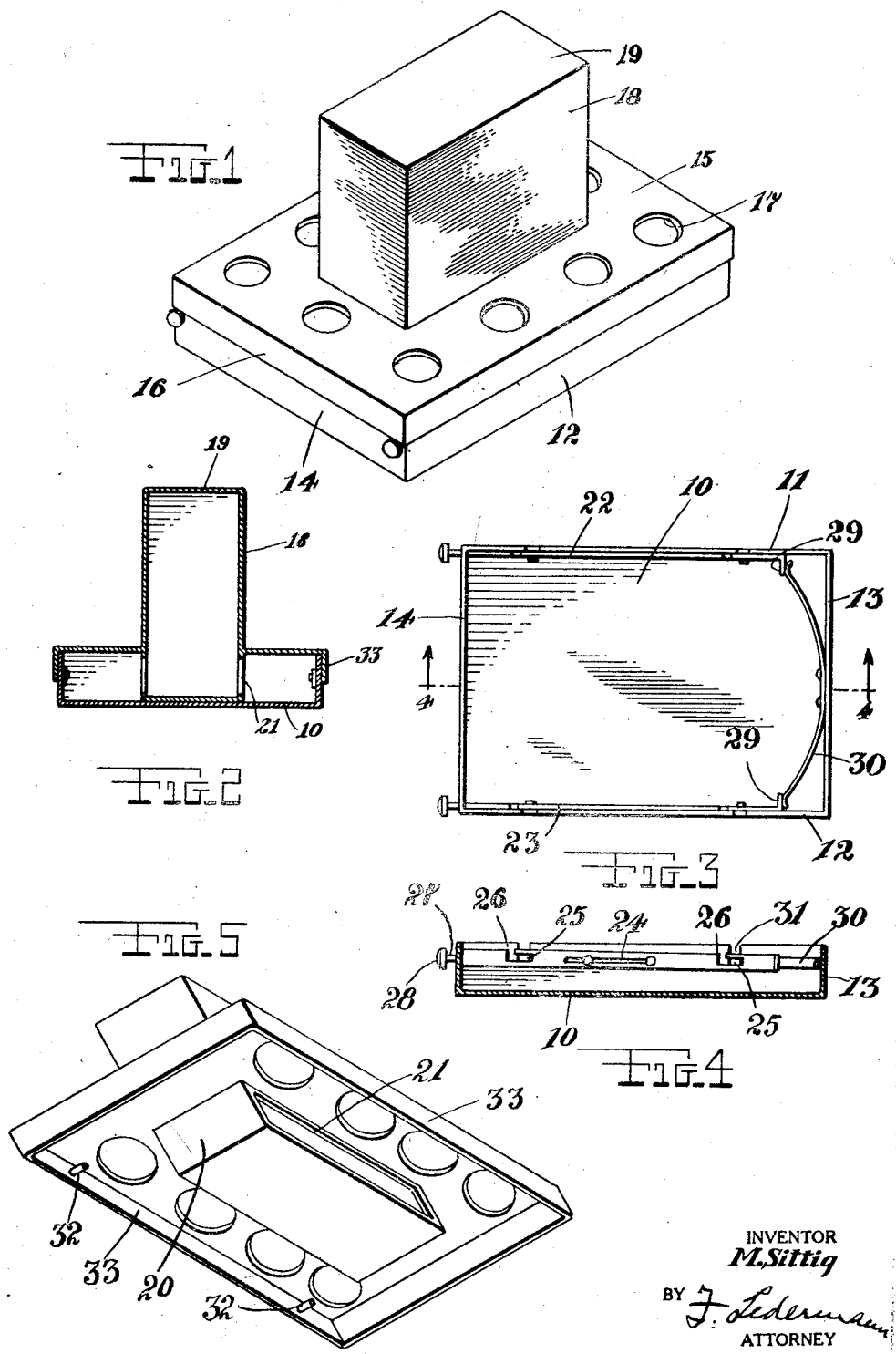
INVENTOR
*M. Sittig*
BY *F. Lederman*
ATTORNEY Patented Dec. 29, 1925.

1,567,760

UNITED STATES PATENT OFFICE.

MINNIE SITTIG, OF DANVERS, ILLINOIS.

WATERING FOUNTAIN FOR CHICKS.

Application filed April 15, 1925. Serial No. 23,226.

*To all whom it may concern:*

Be it known that I, MINNIE SITTIG, a citizen of the United States, residing at Danvers, in the county of McLean and State of Illinois, have invented certain new and useful Improvements in Watering Fountains for Chicks, of which the following is a specification.

The main object of this invention is to provide an improved type of feeding box for poultry and the like. In most of these poultry feeders, the device is constructed in such manner that when the fowl picks and scratches around, the device is generally up-set and the sections parted, strewing the contents thereof over the ground with a consequent wastage. The particular structure illustrated herein embodies a poultry feeder device consisting of two parts, a lower and an upper, the former of which is provided with locking means which cooperates and engages the upper section to interlock both parts together in such manner that tampering by the fowl will not disengage this interlocking means.

The above and other objects will become apparent in the description below, in which similar characters of reference refer to like-named parts in the drawing.

Referring briefly to the drawing, Figure 1 is a perspective view of the poultry feeder device.

Figure 2 is a sectional elevational view of the same.

Figure 3 is a top plan view of the lower pan, showing the feeder locking mechanism.

Figure 4 is a sectional elevational view of Figure 3, taken on line 4—4 of Figure 3.

Figure 5 is a perspective view of the feed container.

Referring in detail to the drawing, the numeral 10 indicates the bottom of a feed pan which is bounded by side walls 11 and 12, and end walls 13 and 14. This pan is open at the top and is normally covered by a plate 15. The latter is of a size slightly larger than the bottom 10 of the pan and is bounded by an angular rim 16 which is approximately half the height of the walls 11, 12, 13, and 14, of the pan. This plate which covers the pan also has a plurality of annular feeding holes 17 which are at spaced-apart positions from each other and extend entirely around the plate, being adapted to permit the insertion of the bill of a fowl into the chamber formed by the pan and plate. The rectangular housing 18 extends vertically upward from the center of the plate 15 and is sealed at its top by a roof 19 which is permanently mounted thereon. This same housing extends thru the plate 15 and also projects for a slight distance thru its bottom. The portion 20 of the housing, which extends downwardly from the plate 15, has relatively large rectangular openings 21 formed therein on the opposite side walls of the housing. The housing chamber is adapted to be filled thru these openings. The locking means are movably mounted on the side walls 11 and 12 of the pan 10 and the same cooperate with elements on the plate 15 whereby the upper portion of the device, consisting of the plate 15 and the housing 18, are releasably locked to the walls 11 and 12 of the pan. The locking means comprise bolts 22 and 23 which are slidably mounted on the interior surfaces of the side walls 11 and 12 by forming projecting pins on these side walls 11 and 12 which register in guide slots 24 formed in the bolts 22 and 23. These bolts 22 and 23 are provided with locking slots 25 at spaced-apart positions intermediate their length and at the forward ends of these slots, the latter are open and communicate with right angled slits 26. The forward ends of these bolts project thru openings provided in the corners of the end wall 14 and the shanks 27, which project thru these openings, have a button head 28 formed at their extreme ends. At the rear ends of these slide bolts 22 and 23, right angled ledges 29 are provided and these ledges are adapted to be continually in contact with the curved ends of a flat resilient spring member 30 which is mounted intermediate its length upon the interior surface of the wall 13 of the pan. Cut-out portions 31 formed in the region of and intersecting the slots 25, are provided on the walls 11 and 12, and are adapted to receive pins 32 which are mounted on the interior surfaces of the side walls 33 which bound the plate member 15.

The poultry feeder is filled with scratch food, or similar grain in the following manner. The plate 15 is removed from the pan by lifting the same after it has been unlocked from the pan. This plate 15 is then inverted so that the roof 19 forms the bottom and the housing 18 is filled with food thru the openings 21 formed in the lower projecting portion 20 of the housing. Before reversing this plate member 15, the food pan is first mounted in place and interlocked with the plate 15. This is accomplished by fitting the walls 11 and 12 over the plate 15 within the bounding walls 16 of the plate and moving said pan about until the pins 32 are engaged in and slip into the guide channels formed by the cutout portions 31. As these pins enter into these guide channels, the bolts 22 and 23 are either independently or collectively moved by depressing the buttons 28 so that the slits 26 align with the cut-out portions 31, and when these slide bolts are aligned in this manner, the pins 32 slip down into the lowermost portions of the cut-out section 31, after which the buttons 28 may be released. The bolts 22 and 23, after being depressed, as described, and released, are urged forwardly by the flat spring 30, thus locking the pins in place in the slots 25, in which manner the upper portion of the feeding device is releasably locked to the lower portion or pan.

I claim—

1. A device of the class described comprising a pan having end and side walls, a plate pierced with openings forming the cover on said pan, downwardly extending walls on said plate, a housing integral with said plate and projecting above the plate and below the plate into the pan, said housing below the plate having openings therein within the pan, pins on the walls of said plate, and means cooperating with the pins for locking the plate in place on the pan.

2. A device of the class described comprising a pan having end and side walls, a plate pierced with openings forming the cover on said pan, downwardly extending walls on said plate, a housing integral with said plate and projecting above the plate and below the plate into the pan, said housing below the plate having openings therein within the pan, pins on the walls of said plate, bolts slidably mounted on the walls of said pan, said bolts having slots therein adapted to receive the pins on the walls of the plate to lock said plate in place on the pan.

3. A device of the class described comprising a pan having end and side walls, a plate pierced with openings forming the cover on said pan, downwardly extending walls on said plate, a housing integral with said plate and projecting above the plate and below the plate into the pan, said housing below the plate having openings therein within the pan, pins on the walls of said plate, bolts slidably mounted on the walls of said pan, slots formed in said bolts parallel to the path of travel of said bolts, and right angled slits communicating with said slots and openings on the sides of said bolts, said slits being adapted to receive the pins on the walls of the plate to convey said pins into the slots.

4. A device of the class described comprising a pan having end and side walls, a plate pierced with openings forming the cover on said pan, downwardly extending walls on said plate, a housing integral with said plate and projecting above the plate and below the plate into the pan, said housing below the plate having openings therein within the pan, pins on the walls of said plate, bolts slidably mounted on the walls of said pan, slots formed in said bolts parallel to the path of travel of said bolts, right angled slits communicating with said slots and opening on the sides of said bolts, said slits being adapted to receive the pins on the walls of the plate to convey said pins into the slots, the walls of said pan supporting the bolts being provided with guide channels which bisect the slots in the bolts, and buttons on said bolts extending internally from the pan walls and adapted to be depressed when aligning the slits on the bolts with the bisecting channels on the walls of the pan to permit entry of the pins on the plate walls into the locking slots of the bolts.

In testimony whereof I affix my signature.

MINNIE SITTIG.